US012658984B2

(12) United States Patent
Nilsson et al.

(10) Patent No.: US 12,658,984 B2
(45) Date of Patent: Jun. 16, 2026

(54) DETERMINATION OF UPLINK MIMO TRANSMISSION STATE FOR A UE

(71) Applicant: Telefonaktiebolaget LM Ericsson (publ), Stockholm (SE)

(72) Inventors: Andreas Nilsson, Gothenburg (SE); Eleftherios Karipidis, Stockholm (SE); Simon Järmyr, Skarpnäck (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 18/288,488

(22) PCT Filed: Apr. 28, 2021

(86) PCT No.: PCT/EP2021/061078
§ 371 (c)(1),
(2) Date: Oct. 26, 2023

(87) PCT Pub. No.: WO2022/228663
PCT Pub. Date: Nov. 3, 2022

(65) Prior Publication Data
US 2024/0214035 A1     Jun. 27, 2024

(51) Int. Cl.
*H04B 7/06* (2006.01)
*H04B 7/0404* (2017.01)
*H04B 7/0413* (2017.01)

(52) U.S. Cl.
CPC ......... *H04B 7/0404* (2013.01); *H04B 7/0413* (2013.01); *H04B 7/06* (2013.01)

(58) Field of Classification Search
CPC ....... H04B 7/0404; H04B 7/0413; H04B 7/06
See application file for complete search history.

(56) References Cited

U.S. PATENT DOCUMENTS

| | | | |
|---|---|---|---|
| 2020/0266947 A1 | 8/2020 | Noh et al. | |
| 2021/0119681 A1* | 4/2021 | Seo ........................ | G06N 3/045 |
| 2022/0287025 A1 | 9/2022 | Jin et al. | |

FOREIGN PATENT DOCUMENTS

| | | |
|---|---|---|
| EP | 3 667 939 A1 | 6/2020 |
| WO | 2021/006524 A1 | 1/2021 |

OTHER PUBLICATIONS

International Search Report and Written Opinion issued in International Application No. PCT/EP2021/061078 Feb. 7, 2022 (13 pages).

* cited by examiner

*Primary Examiner* — Rahel Guarino
(74) *Attorney, Agent, or Firm* — Rothwell, Figg, Ernst & Manbeck, P.C.

(57) ABSTRACT

There is provided mechanisms for determining a UL MIMO transmission state for a UE. A method is performed by a network node. The method comprises obtaining interference affecting network information for the UE. The method comprises signalling an indication of the UL MIMO transmission state towards the UE. The UL MIMO transmission state reflects a rank value. The rank value is a function of the interference affecting network information.

19 Claims, 7 Drawing Sheets

—●— :Max Rank = 2
—○— :Max Rank = 4

DETERMINATION OF UPLINK MIMO TRANSMISSION STATE FOR A UE

CROSS REFERENCE TO RELATED APPLICATIONS

This application is a 35 U.S.C. § 371 National Stage of International Patent Application No. PCT/EP2021/061078, filed 2021 Apr. 28.

TECHNICAL FIELD

Embodiments presented herein relate to a method, a network node, a computer program, and a computer program product for determining an uplink multiple-input multiple-output transmission state transmission state for a user equipment.

BACKGROUND

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO systems, or MIMO for short.

One component in Release 15 of the third generation partnership project (3GPP) New Radio (NR) standard is the support of MIMO antenna deployments and MIMO related techniques. NR supports uplink (UL) MIMO with up to four layers spatial multiplexing using at least four antenna ports with channel dependent precoding. The spatial multiplexing mode is aimed for high data rates in favorable channel conditions.

In closed-loop precoding for the NR uplink, the network node at the network side transmits, based on channel measurements in the reverse link (i.e., in the uplink), a transmit precoder matrix indicator (TPMI) to the user equipment (UE) that the UE should use for uplink transmission. The network node typically configures the UE to transmit uplink reference signals according to the number of antennas the network node would like the UE to use for the uplink transmission to enable the channel measurements at the network node.

The transmit precoder matrix indicator forms part of the UL MIMO transmission state. Other parameters that additionally can be used to define the UL MIMO transmission state, are sounding reference signal resource indications (SRIs) and transmission rank indicators (TRIs). These parameters, as well as the modulation and coding state (MCS), and the uplink resources where uplink data is to be transmitted, can also be determined by channel measurements derived from uplink transmission transmissions from the UE. The transmission rank, and thus the number of spatially multiplexed layers, is reflected in the number of columns of the precoder matrix W. For efficient performance, a transmission rank that matches the channel properties is selected.

NR also supports non-codebook based precoding for uplink data transmission in addition to codebook based precoding. For non-codebook based precoding a set of uplink reference signals resources are transmitted, where each uplink reference signal resource corresponds to one uplink reference signal port precoded by some precoder selected by the UE. The network node can then measure the transmitted uplink reference signals resources and feedback to the UE one or multiple uplink reference signal resource indication (such as an SRI) to instruct the UE to perform uplink data transmission using the precoders corresponding to the referred uplink reference signal resources. The rank in this case will be determined from the number of SRIs fed back to the UE.

By configuring the UE with the higher layer parameter SRS-AssocCSIRS and with the higher layer parameter ulTxConfig set to 'NonCodebook', the UE may be configured with a downlink reference signal, such as a non-zero power (NZP) channel state information reference signal (CSI-RS) to utilize reciprocity to create the precoders used for uplink reference signals and uplink data transmission. Hence, by measuring on the specified CSI-downlink reference signals the UE will be able to perform network transparent precoding based on reciprocity.

Another mode of operation is to instead let the UE select the precoders such that each uplink reference signal resource corresponds to one UE antenna. Hence, in this case the uplink reference signal resource would be transmitted from one UE antenna at the time and the SRIs would hence correspond to different antennas. Thus, by selecting the UE precoders in this way the network node will be able to perform antenna selection at the UE by referring to the different SRIs, which in turn will correspond to different antennas.

Non-codebook based precoding thus encompasses both antenna selection based precoding and network transparent reciprocity based precoding.

As disclosed above, there are different parameters that affect the selection of UL MIMO transmission state to be used by the UE when transmitting uplink signals. As an illustrative example, in NR, the maximum rank for uplink data transmission from the UE can be configured by the network node, for example by setting the parameter maxRank in the PUSCH-Config IE per bandwidth part (BWP), as specified in 3GPP TS 38.331, entitled "NR; Radio Resource Control (RRC); Protocol specification", Version 16.4.0. For example, by setting the parameter maxRank to 2, the UE can only transmit uplink data with a maximum of two layers for that BWP. However, there are scenarios where the selection of the parameter maxRank in this way does not yield optimum performance.

Hence, there is still a need for an improved selection of the UL MIMO transmission state in general and the selection of the maximum rank for uplink transmission from the UE in particular.

SUMMARY

An object of embodiments herein is to provide accurate selection of the UL MIMO transmission state for a UE.

According to a first aspect there is presented a method for determining a UL MIMO transmission state for a UE. The method is performed by a network node. The method comprises obtaining interference affecting network information for the UE. The method comprises signalling an indication of the UL MIMO transmission state towards the UE. The UL MIMO transmission state reflects a rank value. The rank value is a function of the interference affecting network information.

According to a second aspect there is presented a network node for determining a UL MIMO transmission state for a UE. The network node comprises processing circuitry. The processing circuitry is configured to cause the network node to obtain interference affecting network information for the UE. The processing circuitry is configured to cause the network node to signal an indication of the UL MIMO transmission state towards the UE. The UL MIMO transmission state reflects a rank value. The rank value is a function of the interference affecting network information.

According to a third aspect there is presented a network node for determining a UL MIMO transmission state for a UE. The network node comprises an obtain module configured to obtain interference affecting network information for the UE. The network node comprises a signal module configured to signal an indication of the UL MIMO transmission state towards the UE. The UL MIMO transmission state reflects a rank value. The rank value is a function of the interference affecting network information.

According to a fourth aspect there is presented a computer program for determining a UL MIMO transmission state for a UE, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide accurate selection of the UL MIMO transmission state for the UE.

Advantageously, these aspects enable selection of a maximum rank value for the UE.

Advantageously, restricting the maximum rank might reduce the SRS overhead. For example, a UE with 4 transmit antennas (or antenna ports) can be configured to use a maximum of 2 SRS ports instead of four SRS ports if the maximum rank is set to 2 instead of 4.

Advantageously, for a UE where all power amplifiers (PAs) can be configured to transmit with full output power, restricting the maximum rank will lead to the PAs operating closer to maximum power, leading to better PA efficiency and hence reduce energy consumption of the UE.

Advantageously, these aspects enable the UL MIMO transmission state to be selected as a function of a biasing value.

Advantageously, these aspects yield improved system performance in the uplink.

Advantageously, these aspects require very low computational effort

Advantageously, these aspects enable reduced energy consumption and heat generation at the transmission and reception point.

Advantageously, these aspects enable improved uplink performance for UEs where achieving high reliability and/or low latency is more important than reaching peak throughput.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
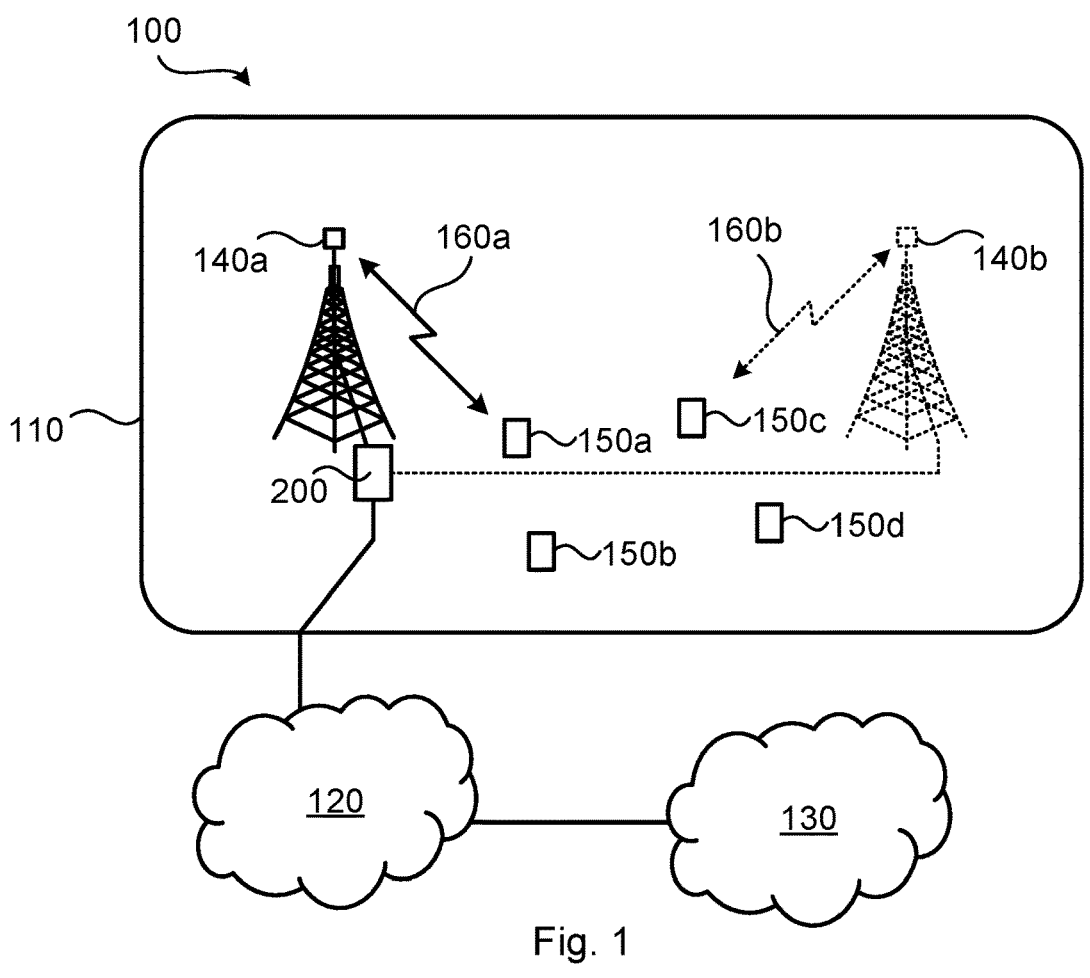
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, a sixth generation (6G) telecommunications network, or any evolvement thereof, and support any 3GPP, IEEE, or other telecommunications standard, where applicable.

The communication network 100 comprises a network node 200 configured to provide network access to user equipment, as represented by UEs 150a, 150b, 150c, 150d, in a radio access network 110. The radio access network 110 is operatively connected to a core network 120. The core network 120 is in turn operatively connected to a service network 130, such as the Internet. The UEs 150a:150d are thereby enabled to, via the network node 200, access services of, and exchange data with, the service network 130.

The network node 200 comprises, is collocated with, is integrated with, or is in operational communications with, at least one transmission and reception point (TRP) 140a, 140b. The network node 200 (via its at least one TRP 140a, 140b) and the user equipment UEs 150a:150d are configured to communicate with each other over wireless links, as illustrated at reference numeral 160a, 160b.

Examples of network nodes 200 are radio access network nodes, radio base stations, base transceiver stations, Node Bs, evolved Node Bs (eNBs), gNBs, access points, access nodes, and backhaul nodes. Examples of UEs 150a:150d are wireless devices, mobile stations, mobile phones, handsets, wireless local loop phones, smartphones, laptop computers, tablet computers, network equipped sensors, network equipped vehicles, and so-called Internet of Things (IoT) devices.

Figure 2:
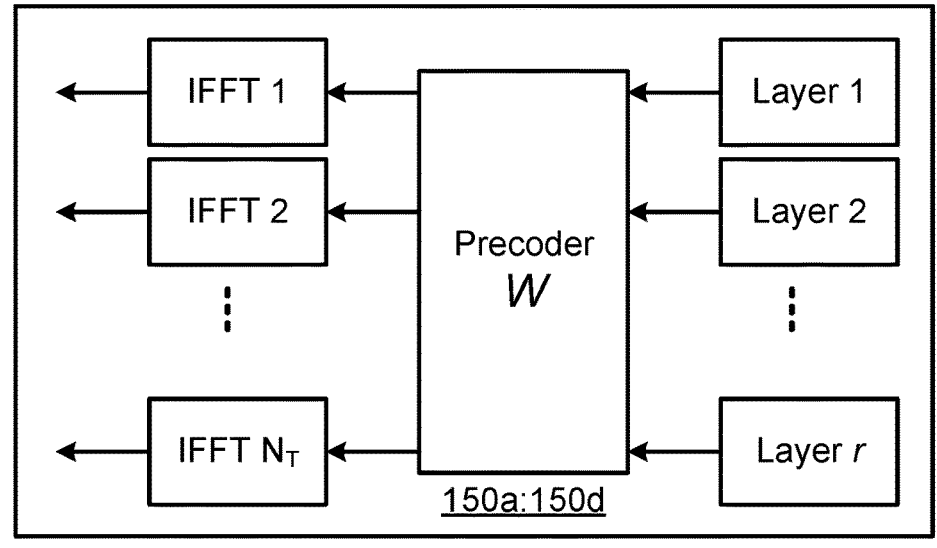
FIG. 2 schematically illustrates an example transmission architecture for a UE according to an embodiment.

Assume that the UE 150a:150d is to transmit a symbol vector s for r layers in the uplink from $N_T$ antenna ports. FIG. 2 schematically illustrates an example transmission architecture for such a UE 150a:150d. Before transmission, the symbol vector s is precoded, as represented by a precoder matrix W of dimension an $N_T$-by-r dimension, and then subjected to an inverse Fast Fourier Transform (IFFT).

The information carrying symbol vector s is thus multiplied by an $N_T$-by-r precoder matrix W, which serves to distribute the transmit energy in a subspace of the $N_T$ (corresponding to the $N_T$ antenna ports) dimensional vector space. The precoder W can be a wideband precoder, which is constant over frequency, or frequency selective. The precoder matrix is typically selected from a codebook of possible precoder matrices, and is typically indicated to the UE 150a:150d from the network node 200 by means of a transmit precoder matrix indicator (TPMI), which specifies a unique precoder matrix in the codebook for a given number of symbol streams. In this way, spatial multiplexing is achieved since multiple symbols can be transmitted simultaneously over the same time/frequency resource element (TFRE). The r symbols in the symbol vector s each correspond to a layer and r is referred to as the transmission rank, and is thus the rank to be used by the UE 150a:150d for uplink transmission. The number of symbols in the symbol vector s (and thus the value of r) is typically adapted to suit the current channel properties.

At the network node 200 (or the serving TRP 140a) a vector $y_n$ of dimension $N_R$-by-r is received for a certain TFRE on subcarrier n (or alternatively data TFRE number n), where $N_R$ is the number of receive antenna ports (or receive chains) at the network node 200 (or the serving TRP 140a). The vector $y_n$ can be modeled as:

$$y_n = H_n W s_n + e_n$$

where $H_n$ is an $N_R$-by-$N_T$ MIMO channel matrix, and $e_n$ is a noise/interference vector obtained as realizations of a random process. The precoder matrix W is often selected to match the characteristics of the $N_R$-by-$N_T$ MIMO channel matrix $H_n$, resulting in so-called channel dependent precoding. This is also commonly referred to as closed-loop precoding. Closed-loop precoding essentially strives to focus the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W is to select the hypothesized precoder matrix $W_k$ that maximizes the Frobenius norm of the hypothesized equivalent channel (and thus yields highest channel capacity):

$$\max_k \left\| \hat{H}_n W_k \right\|_F^2,$$

where $\hat{H}_n$ is a channel estimate, possibly derived from uplink reference signals, where $W_k$ is a hypothesized precoder matrix with index k, and where $\hat{H}_n W_k$ is the hypothesized equivalent channel.

As noted above there is still a need for an improved selection of the UL MIMO transmission state in general and the selection of the maximum rank for uplink transmission from the UE in particular In further detail, due to bursty and un-predictable inter-cell interference, link adaptation may sometimes overestimate the rank selection for UL transmission, leading to reduced UL performance. Overestimation here implies that the channel is estimated to be better than what it actually is (and thus that the interference is estimated to be lower than what it actually is). This could result in that the value of the rank selected for the UE 150a:150d to use in the uplink is too high.

Figure 3:
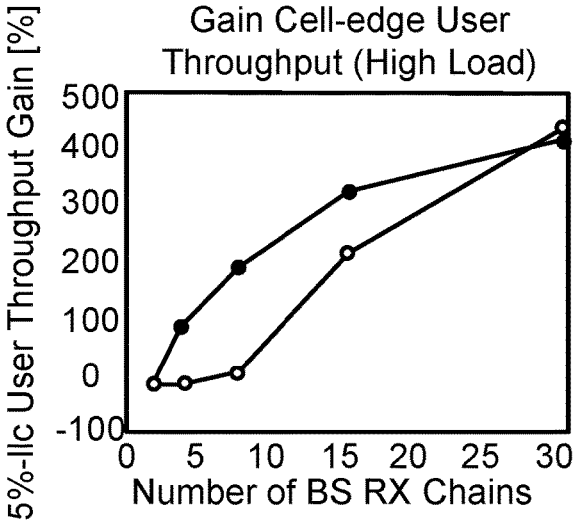
FIG. 3 schematically illustrates simulation results according to an embodiment.
Figure 3:
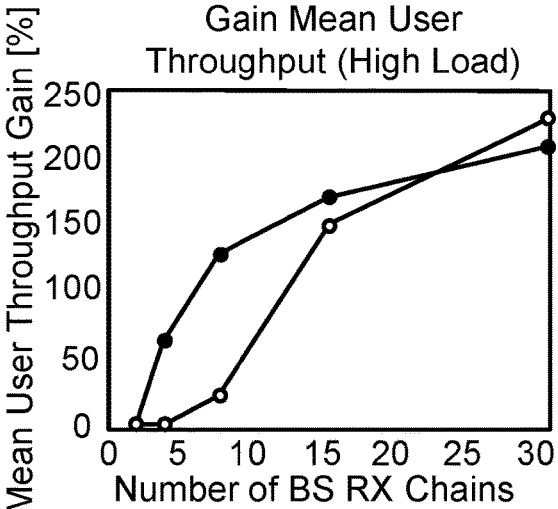
Figure 3:
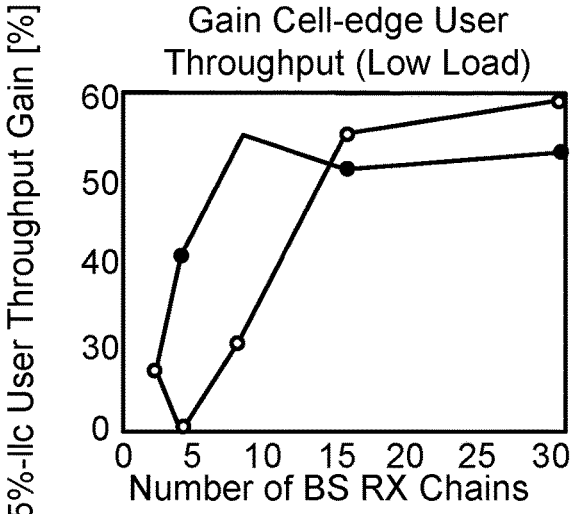
Figure 3:
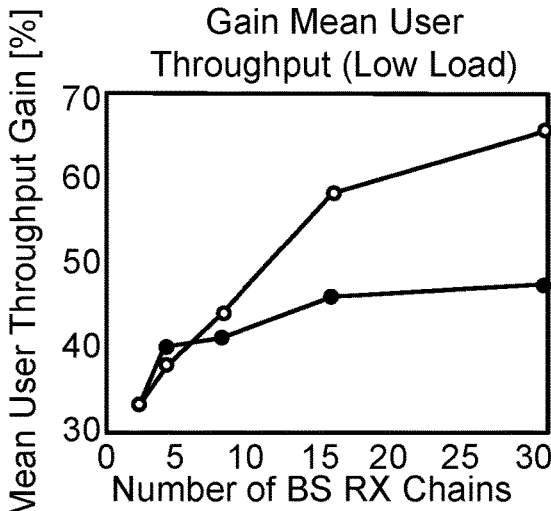

One example of this is illustrated in FIG. 3, which show simulation results in terms of user throughput gain (in percentage) as a function of number of receive chains at the serving TRP (denoted number of BS RX chains) for different settings. The simulation results are shown for an urban microcellular (UMi) scenario for four UEs 150a:150d transmitting data in the uplink with directional antennas pointing in opposite directions with Rel-15 power scaling. As can be seen, the optimal performance (user throughput gain relative fixed rank 1) based on a max rank restriction depends on the number for receiver chains at the TRP, the traffic load in the system (top two figures show high load, and bottom two figures show low load) and if one optimizes for cell-edge user throughput or mean user throughput. For cell-edge user throughput, using a fixed rank 1 yields best performance for 2 and 4 receive chains at the TRP when there is high load in the system (as in the upper left plot). While for mean user throughput, using a maximum rank 4 yields best performance for more than 4 receive chains at the TRP when there is low load in the system.

Proper spatial receive filtering, e.g., interference-rejection combining (IRC), at the network node 200 and/or the TRP 140a can become very computationally demanding, especially as the number of receive chains increases. Existing solutions include suboptimal spatial filtering, like maximum-ratio combining (MRC) or partial IRC, with a significant loss in performance due to its limited capability to handle interference. Other alternatives may include the use of advanced hardware at the network node 200 and/or TRP 140a to handle the computational demand of optimal filtering, but may be costly and/or consume substantial power and/or generate heat that can be problematic.

The embodiments disclosed herein therefore relate to mechanisms for determining a UL MIMO transmission state for a UE 150a:150d. In order to obtain such mechanisms there is provided a network node 200, a method performed by the network node 200, a computer program product comprising code, for example in the form of a computer program, that when run on a network node 200, causes the network node 200 to perform the method.

Figure 4:
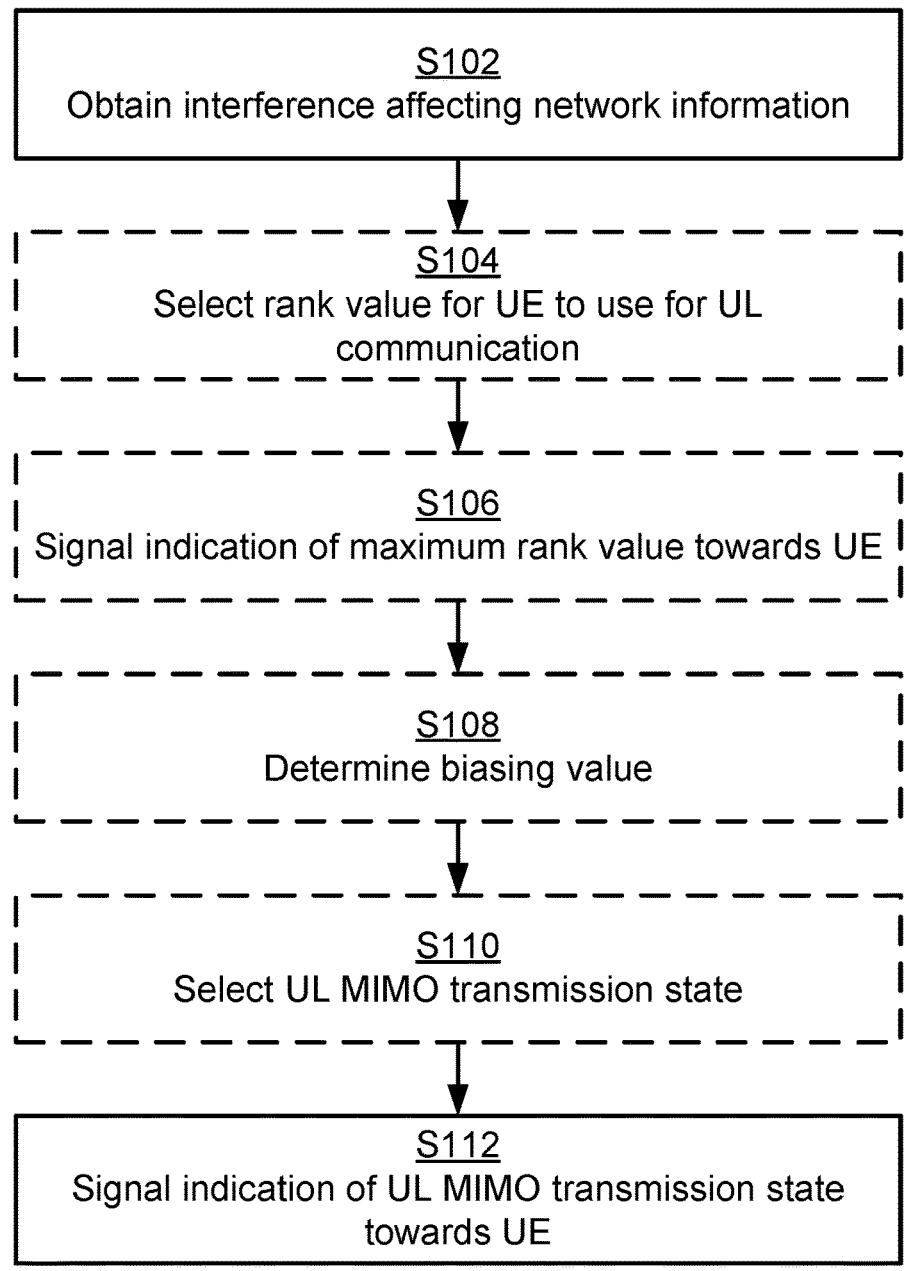
FIG. 4 is a flowchart of methods according to embodiments.

FIG. 4 is a flowchart illustrating embodiments of methods for determining a UL MIMO transmission state for a UE 150a:150d. The methods are performed by the network node 200. The methods are advantageously provided as computer programs 1020.

S102: The network node 200 obtains interference affecting network information for the UE 150a:150d.

S112: The network node 200 signals an indication of the UL MIMO transmission state towards the UE 150a:150d. The UL MIMO transmission state reflects a rank value. The rank value is a function of the interference affecting network information.

Embodiments relating to further details of determining a UL MIMO transmission state for a UE 150a:150d as performed by the network node 200 will now be disclosed.

In some aspects, the network node 200 adapts the maximum rank to be used in the uplink for the UE 150a:150d based on the interference affecting network information.

In particular, in some embodiments, the network node 200 is configured to perform (optional) step S104:

S104: The network node 200 selects the rank value as a maximum rank value for the UE 150a:150d to use for UL communication with the network node 200. The maximum rank value is selected as a function of the interference affecting network information. The UL MIMO transmission state is selected as a function of the maximum rank value.

In this respect, the network node 200 might select a rank values from a subset of possible rank values, where the subset of possible rank values are the rank values equal to or smaller than the maximum rank value.

In some embodiments, the maximum rank value is selected for UL communication in terms of UL data communication and/or UL control communication.

The rank value might then be signalled to the UE 150a: 150d. Hence, in some embodiments, the network node 200 is configured to perform (optional) step S106:

S106: The network node 200 signals an indication of the maximum rank value towards the UE 150a:150d.

There could be different ways for the network node 200 to signal the indication of the maximum rank value towards the UE 150a:150d as in step S106.

In some embodiments, the indication of the selected maximum rank value is signalled as downlink control information (DCI). In other embodiments, the indication of the selected maximum rank value is signalled in parameter maxRank in a configuration information element for a Physical Uplink Shared Channel (PUSCH). In yet other embodiments, the indication of the selected maximum rank value is signalled in a medium access control (MAC) control element (CE) message, or in a radio resource control (RRC) message. A (dedicated) MAC-CE message might thus be used to convey this information so as to dynamically update the maxRank parameter for PUSCH (which is more dynamic compared to using RRC signaling).

In some embodiments, the indication of the selected maximum rank value is signalled in a medium access control, MAC, control element, CE, message, or in a radio resource control, RRC, message.

The rank value might be determined per UE 150a:150d, per group of UEs 150a:150d, per TRP 140a:140b, or per group of TRPs 140a:140b. In particular, in some embodiments, one maximum rank value is selected per each UE 150a:150d served by a TRP 140a of the network node 200. In some embodiments, one maximum rank value is selected per each group of UEs 150a:150d served by the TRP 140a of the network node 200. In some embodiments, one maximum rank value is selected per all UEs 150a:150d served by the TRP 140a of the network node 200. In some embodiments, one maximum rank value is selected per all UEs 150a:150d served by the TRP 140a of the network node 200 and at least one other TRP 140b of the network node 200.

The rank value might be determined per carrier. In particular, in some embodiments, one maximum rank value is selected per each carrier used by the UE 150a:150d for UL communication with the network node 200.

In some aspects, two or more different bandwidth parts (BWPs) are configured with different maximum rank value settings, and the network node 200 uses a DCI to switch active BWP in order to update the maximum rank value for coming uplink data transmission from the UE 150a:150d. In particular, in some embodiments, one maximum rank value is selected per each bandwidth part usable by the UE 150a:150d for UL communication with the network node 200. The indication of the selected maximum rank value might then indicate over which bandwidth part the UL communication is to be used by the UE 150a:150d for the UL communication with the network node 200. Further, the condition on the maximum rank value might only be applied on a selected part of the bandwidth, where this part of the bandwidth is determined by the network node 200. If the network node 200 detects, or can assume, that it will be difficult to recover a signal received from a particular UE in a part of the bandwidth that is without any condition on the maximum rank value, the network node 200 might then schedule this UE in the part of the bandwidth where the condition on the maximum rank value is applied and where the rank of the inter-cell interference likely will be lower.

In some aspects, the number of used sounding reference signal (SRS) ports of the UE 150a:150d is adapted based on rank restriction. In some embodiments, the indication of the selected maximum rank value indicates a configuration of SRS ports to be used by the UE 150a:150d for the UL communication with the network node 200. In some embodiments, one maximum rank value is selected per each configuration usable by the UE 150a:150d for UL communication with the network node 200, and the indication of the selected maximum rank value indicates which configuration to be used by the UE 150a:150d.

This enables the number of SRS ports for uplink codebook based precoding (e.g. the total number of SRS ports configured per SRS resource or over all SRS resources in an SRS resource set with usage 'codebook') or alternatively the number of SRS ports used for non-codebook precoding (e.g. the total number of SRS ports configured in an SRS resource set with usage 'nonCodebook') to be configured based on the rank restriction. The number of SRS ports in any of these SRS resource sets can be such that the total number of SRS ports in the SRS resource set is equal to the maximum rank value.

In this way, if the rank restriction (defined by the maximum rank value) is set to max rank=2, then two SRS ports are used for codebook based uplink transmission for the UE 150a:150d and if the rank restriction is max rank=4, then 4 SRS ports are used. This is useful since in high traffic load scenarios SRS capacity can become a problem.

In some aspects, instead of determining the UL MIMO transmission state based only on highest spectral efficiency for a UE 150a:150d, the network node 200 could also considers the rank selection when determining preferred TPMIs, TRIs, and/or SRIs, such that a TPMI, TRI, and/or SRI with lower rank might be selected even though a TPMI, TRI, and/or SRI with higher rank has slightly higher spectral efficiency.

Hence, in some embodiments, the UL MIMO transmission state is defined by at least one of: a TPMI, a TRI, an SRI. In this respect, for non-codebook based uplink transmission neither the RI nor the TPMI are signalled; instead the rank is indicated implicitly indicated from the SRI.

Additionally, the UL MIMO transmission state might be defined by a modulation and coding scheme (MCS). This could be done with help of a biasing value. Hence, in some embodiments, the network node 20 is configured to perform (optional) Step S108:

S108: The network node 200 determines a biasing value as a function of the interference affecting network information from the UE 150a:150d.

The biasing value is then used when the UL MIMO transmission state is selected. Hence, in some embodiments, the network node 20 is configured to perform (optional) Step S110:

S110: The network node 200 selects the UL MIMO transmission state as a function of the biasing value and channel measurements for the UE 150a:150d.

In some embodiments, the TPMI, TRI, and/or SRI is selected based on optimizing spectral efficiency, and wherein the biasing value is an offset spectral efficiency value that biases selection of TPMIs, TRIs, and/or SRIs with lower rank over TPMIs, TRIs, and/or SRIs with higher rank.

As a non-limiting and illustrative example, assume that a TPMI for rank 2 has spectral efficiency S2, and a TPMI for rank 4 has spectral efficiency S4, then if S2+T>S4, where T denotes the biasing value, then the TRP will select TPMI for rank 2 instead of TPMI for rank 4, even though S4>S2.

The biasing value might be determined per UE 150a: 150d, per group of UEs 150a:150d, per TRP 150:150b, or per group of TRPs 150:150b. Particularly, in some embodiments, one biasing value is selected per each UE 150a:150d served by a TRP 140a of the network node 200. In some embodiments, one biasing value is selected per each group of UEs 150a:150d served by the TRP 140a of the network node 200. In some embodiments, one biasing value is selected per all UEs 150a:150d served by the TRP 140a of the network node 200. In some embodiments, one biasing value is selected per all UEs 150a:150d served by the TRP 140a of the network node 200 and at least one other TRP 140b of the network node 200.

There could be different examples of the interference affecting network information. In some non-limiting examples, the interference affecting network information pertains to at least one of: traffic load in a cell served by the network node 200, traffic load in a cell neighbouring the cell served by the network node 200, number of receiver radio chains in the network node 200.

In some non-limiting examples, the interference affecting network information pertains to at least one of: average traffic load in a system in which the network node 200 is operating, number of receiver radio chains in a network node 200 serving a cell neighbouring the cell served by the network node 200, number of antenna ports at the UE 150a:150d, frequency carrier used by the UE 150a:150d for UL communication with the network node 200, number of aggregated carriers used by the UE 150a:150d for UL communication with the network node 200, which link budget the UE 150a:150d has, which priority communication of the UE 150a:150d has, which type of application the UL communication with the network node 200 pertains to, which power scaling scheme is applied at the UE 150a:150d, which type of power class the UE 150a:150d belongs to, which type of device the UE 150a:150d is.

Thus, the network node 200 can consider instantaneous traffic load for the serving TRP 140a and/or the neighboring TRPs 140b, information about the number of receiver chains (receiver antenna ports) in the network node 200 (or serving TRP 140a), the carrier frequency (which typically is related to how directional the UE antenna radiation pattern is), the number of uplink carriers that the UE 150a:150d can use for aggregated transmission, power scaling method of the UEs 150a:150d, number transmit chains for the UEs 150a:150d, etc.

In terms of the number of UE antennas, all UEs with four transmit antennas might be configured with a maximum rank value of 2, whilst UEs with two transmit antennas might be configured with a maximum rank value of 1. This does not necessarily imply that the network node 200 signals any explicit indication, or configuration, of the maximum rank value to the UEs, just that the network node 200 determines a maximum rank value and then determines the actual rank based on this value. In terms of the number of UE antennas for a respective carrier, for a first carrier all UEs with 4 transmit antennas might be configured with a maximum rank value of 2 and all UEs with 2 transmit antennas might be configured with a maximum rank value of 1. On a second carrier, all UEs with 4 transmit antennas might be configured with a maximum rank value of 1, whilst all UEs with two transmit antennas might be configured with a maximum rank value of 1. In terms of the UE type, some UE types might be more suitable for rank restriction that other UE types. For example UE Type 1 might be configured with a maximum rank value of 2, whilst UE Type 2 might be configured with a maximum rank value of 1. In terms of UE power class, 3GPP TS 38.101 specifies four Power Classes for UEs namely, Power Classes 1, 2, 3 and 4, having different output power for different applications. UEs 150a:150d of these different power classes might be configured with different maximum rank values. In terms of different UL power scaling methods, UEs with a power scaling method from Rel-15 might be configured with a maximum rank value of 1, while UEs with a power scaling method from Rel-16 might be configured with a maximum rank value of 2. In terms of the link budget to the UE 150a:150d, UEs 150a: 150d above a certain threshold in link budget might not be affected by rank restrictions (since they are more likely to be located close to the serving TRP 150a and therefore also are likely to generate less inter-TRP interference), while UEs below a certain threshold in link budget are affected by the rank restriction. In terms of the priority of the UEs communication, a high priority UE might not be affected by rank restriction, whereas a low priority UE will be.

Also, the network node 200 can take into account the type of application that the data traffic of the UE 150a:150d pertains to, e.g., a an ultra reliable low latency (URLLC) service has different requirements (e.g. in terms of throughput, latency, and decoding probability) than an enhance mobile broad band (eMBB) service, thus potentially leading to different selections of UL MIMO transmission states by the network node 200.

Figure 5:
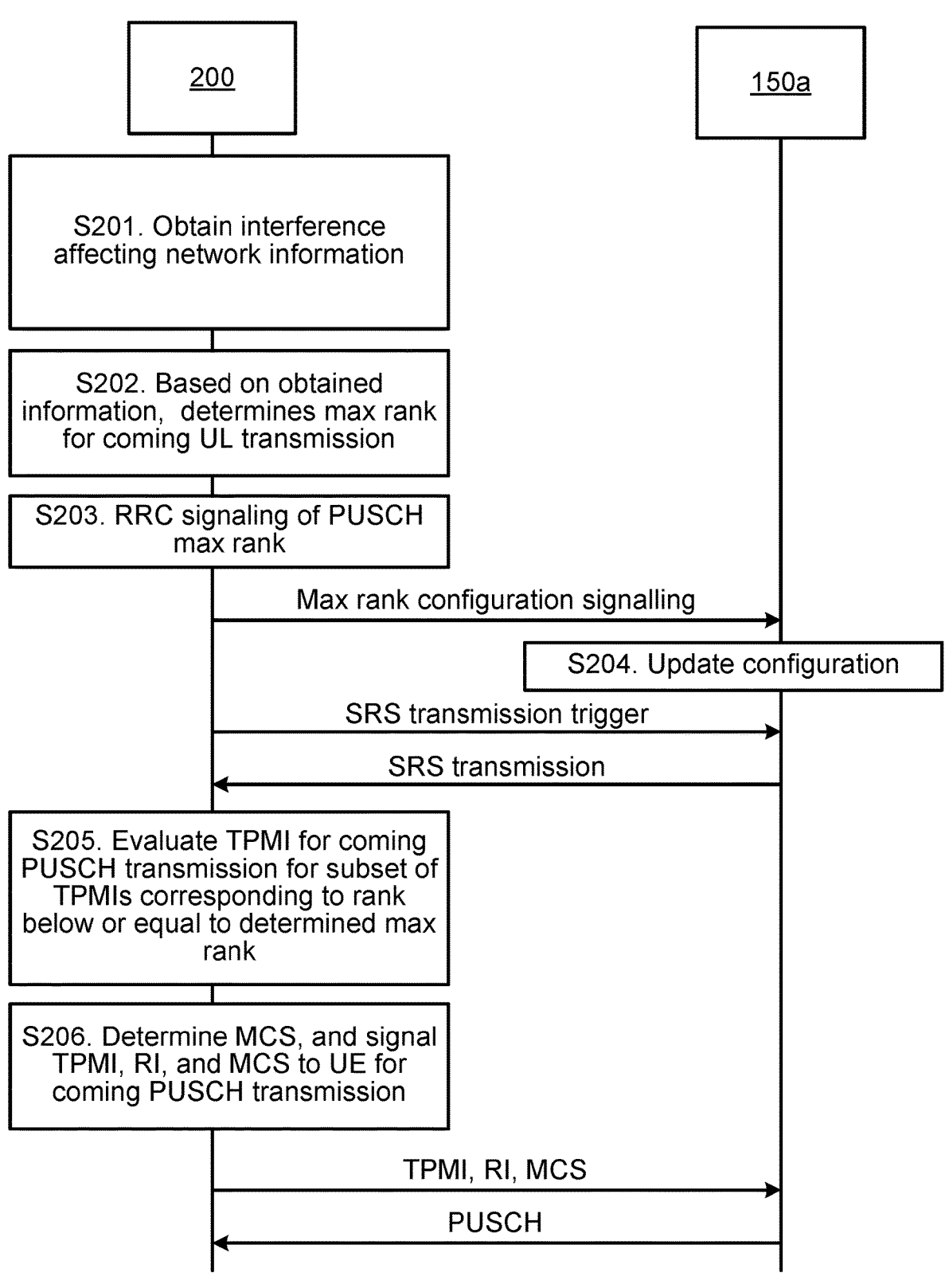
FIG. 5 and FIG. 6 are signalling diagram according to embodiments.

Reference is next made to FIG. 5 which is a signalling diagram of a method according to the herein disclosed embodiments where the network node 200, for example, signals an indication of the maximum rank value towards the UE 150a:150d.

In step S201 network node 200 obtains interference affecting network information for UE 150a.

In Step S202, based on the obtained information network node 200 selects a suitable maximum rank value for each respective TRP (or per group of TRPs) and/or per UE (or per group of UEs) for coming uplink transmission of control signals and/or data signals from UE 150a.

In Step S203 network node 200 re-configures UE 150a with a new UL rank restriction by updating the parameter maxRank in PUSCH Config IE as specified in aforementioned 3GPP TS 38.331 in accordance with the selected maximum rank value.

In some alternatives, step S203 and step S204 are optional.

In some alternatives, step S203 and step S204 are performed on a longer time scale than the remaining steps in order to minimize the overhead signal required from step S203 and step S204. For example, the traffic load in the system might be high for several hours during each day (which might be known from prior statistical measurements), and a certain rank restriction might then be applied during these hours.

In step S205, network node 200 determines the TPMI, TRI, and/or SRI, etc. for the coming uplink data transmission from UE 150a. Due to the rank restrictions, the TRP only needs to evaluate a subset of all TPMI, TRI, and/or SRI, etc., which will save energy and reduce heat generation at the TRP, but also reduce the latency for making a decision.

In Step S206, network node 200 signals the TPMI, TRI, and/or SRI, etc. to UE 150a for UE 150a to use for the coming uplink data transmission.

Figure 6:
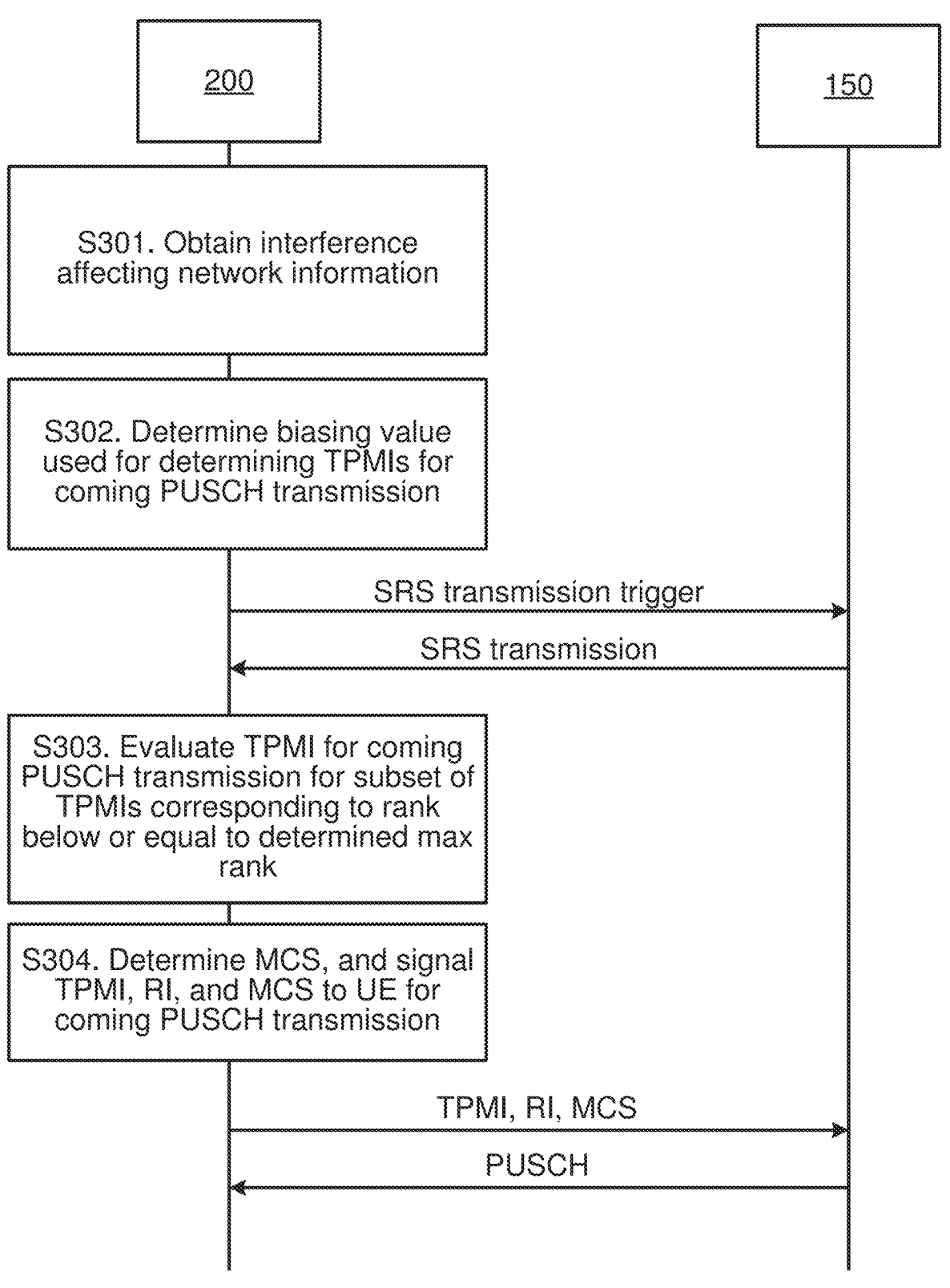

Reference is next made to FIG. 6 which is a signalling diagram of a method according to the herein disclosed embodiments where the network node 200, for example, selects the UL MIMO transmission state as a function of the biasing value and channel measurements for the UE 150a:150d.

In step S301 network node 200 obtains interference affecting network information for UE 150a.

In step S302, based on the obtained information network node 200 determines a biasing value (per UE, per carrier per UE, for a group of UEs, for a cluster of TRPs, for the whole cell, for particular application types, or other possible ways), that can be used during TPMI, TRI, and/or SRI selection for uplink data transmission from UE 150a. The purpose of the biasing value is to let the TRP select a TPMI, TRI, and/or SRI with lower rank instead of a TPMI, TRI, and/or SRI with higher rank, even though the TPMI, TRI, and/or SRI with higher rank was estimated to give higher spectral efficiency. For example, assume that a TPMI for rank 2 has spectral efficiency S2, and a TPMI for rank 4 has spectral efficiency S4, then if S2+T>S4, where T represents the biasing value, then the TRP will select TPMI for rank 2 instead of TPMI for rank 4, even though S4>S2. The biasing value can be determined per UE, for example based on number of antennas at the UE, power scaling method of the UE, etc.

In Step S303 network node 200 determines the TPMI, TRI, and/or SRI, etc. for the coming uplink data transmission by using the biasing value.

In Step S304, network node 200 signals the TPMI, TRI, and/or SRI, etc. to UE 150a for UE 150a to use for the coming uplink data transmission.

Figure 7:
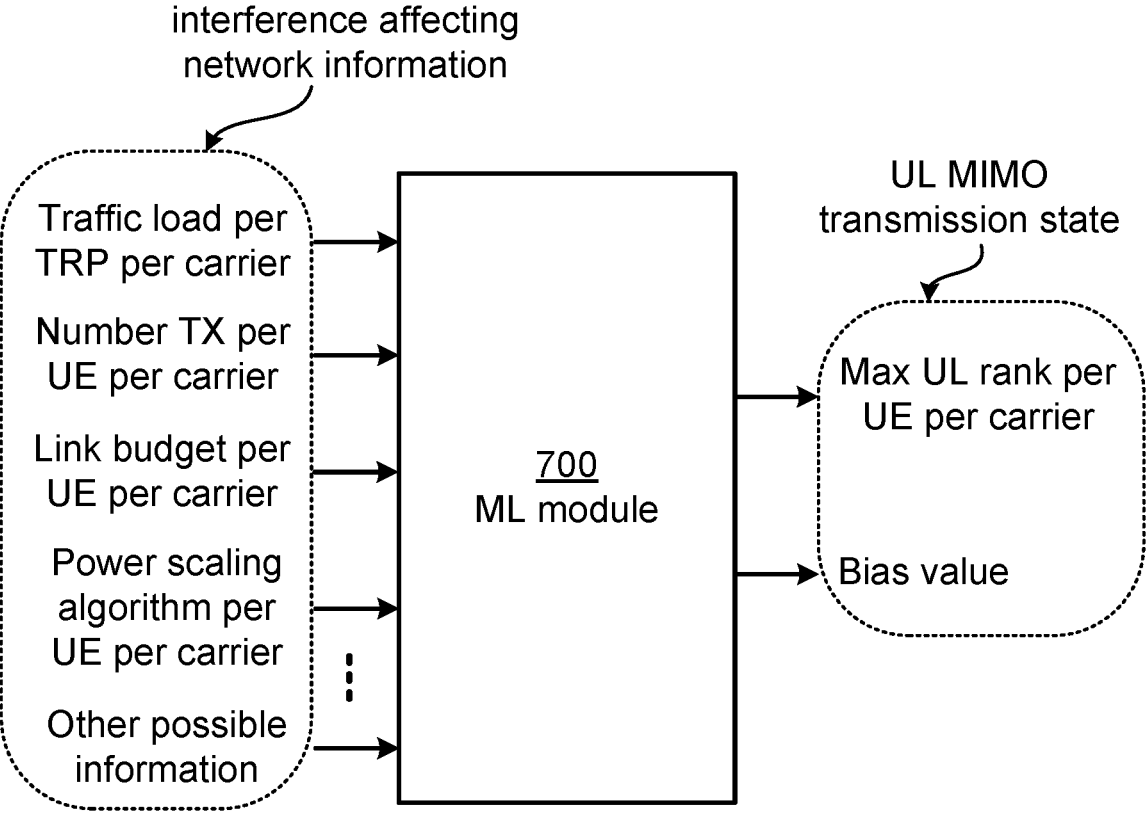
FIG. 7 schematically illustrates implementation using machine learning according to an embodiment.

In some examples, the selection of the UL MIMO transmission state, the rank value, and/or the biasing value is implemented by a machine learning (ML) algorithm. The ML algorithm works as follows. First, input data (in terms of interference affecting network information) is collected. The ML algorithm then identifies which scenario, from a set of scenarios (where each scenario is associated with different values of the interference affecting network information) the input data represents, for example by a table look-up, by running a classification algorithm, etc. The ML algorithm then maps the identified scenario to a UL MIMO transmission state, maximum rank value, and/or biasing value. Reference is here made to FIG. 7 which schematically illustrates examples of input parameters used by such a machine learning algorithm, as represented by an ML module 700. The ML algorithm is provided with vectors of values of the above disclosed examples of interference affecting network information, such as traffic load per TRP per carrier, number of transmit ports per UE per carrier, link budget per UE per carrier, power scaling algorithm per UE per carrier, etc.

Although at least some of the embodiments have been disclosed in the context codebook based UL transmission using TPMIs to inform the UE 150a:150d about precoders to be used by the UE 150a:150d for uplink data transmission, the herein disclosed embodiments are also applicable for non-codebook based UL transmission, where SRIs are used instead of TPMIs to indicate the rank and the corresponding precoders to be used by the UE 150a:150d for the uplink data transmission.

Figure 8:
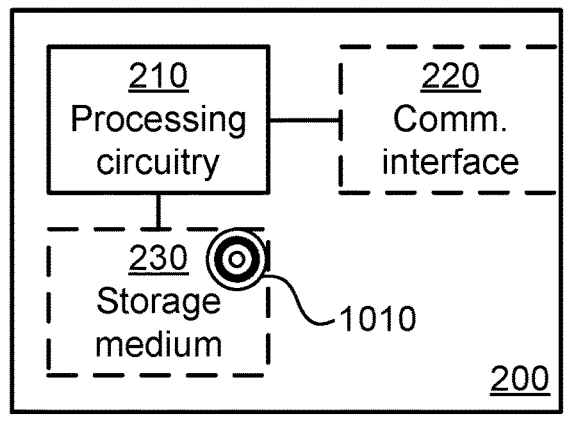
FIG. 8 is a schematic diagram showing functional units of a network node according to an embodiment.

FIG. 8 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices of the communication network 100 as well as other entities, functions, nodes, and devices served by, or operatively connected to the communication network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 9:
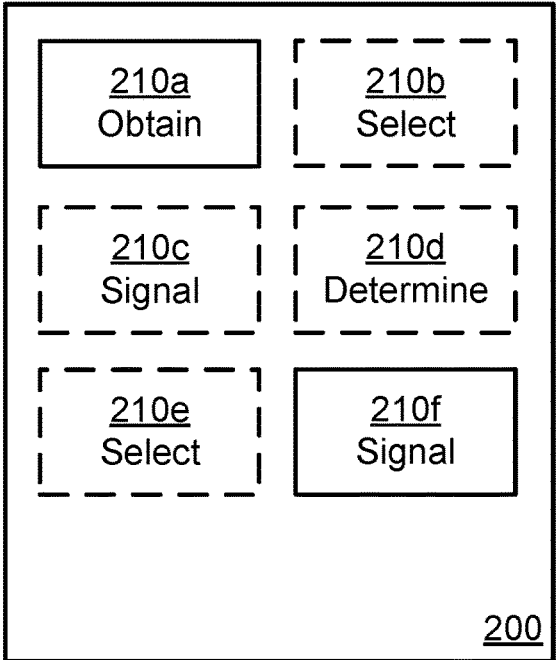
FIG. 9 is a schematic diagram showing functional modules of a network node according to an embodiment.

FIG. 9 schematically illustrates, in terms of a number of functional modules, the components of a network node 200 according to an embodiment. The network node 200 of FIG. 9 comprises a number of functional modules; an obtain module 210a configured to perform step S102, and a signal module 210f configured to perform step S112. The network node 200 of FIG. 9 may further comprise a number of optional functional modules, such as any of a select module 210*b* configured to perform step S104, a signal module configured to perform step S106, a determine module 210*d* configured to perform step S108, and a select module 210*e* configured to perform step S110.

In general terms, each functional module 210*a*:210*f* may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210*a*:210*f* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*:210*f* and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 8 the processing circuitry 210 may be distributed among a plurality of devices, or nodes. The same applies to the functional modules 210*a*:210*f* of FIG. 9 and the computer program 1020 of FIG. 10.

Figure 10:
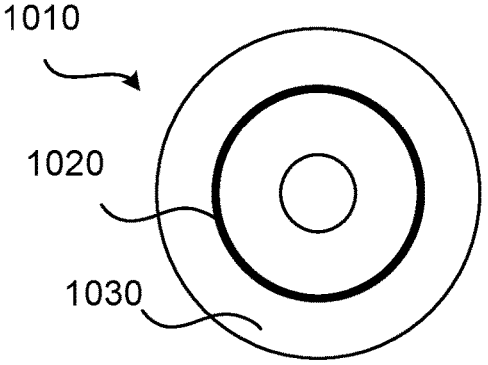
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining an uplink (UL) multiple-input multiple-output (MIMO) transmission state for at least a first user equipment (UE), the method being performed by a network node, the method comprising:
   obtaining interference affecting network information for the first UE; and
   signalling an indication of the UL MIMO transmission state towards the first UE, wherein
   the UL MIMO transmission state reflects a rank value, and
   the rank value is based on the interference affecting network information.

2. The method of claim 1, wherein
   the method further comprises: selecting the rank value as a maximum rank value for the first UE to use for UL communication with the network node,
   the maximum rank value is selected based on the interference affecting network information, and
   the UL MIMO transmission state is selected based on the maximum rank value.

3. The method of claim 2, wherein the method further comprises:
   signalling an indication of the maximum rank value towards the first UE.

4. The method of claim 3, wherein the indication of the selected maximum rank value is signalled as downlink control information, DCI.

5. The method of claim 3, wherein the indication of the selected maximum rank value is signalled in parameter maxRank in a configuration information element for a Physical Uplink Shared Channel, PUSCH.

6. The method of claim 3, wherein the indication of the selected maximum rank value is signalled in a medium access control, MAC, control element, CE, message, or in a radio resource control, RRC, message.

7. The method of claim 3, wherein one maximum rank value is selected per each carrier used by the first UE for UL communication with the network node.

8. The method of claim 3, wherein one maximum rank value is selected per each bandwidth part usable by the first UE for UL communication with the network node, and wherein the indication of the selected maximum rank value indicates over which bandwidth part the UL communication is to be used by the first UE for the UL communication with the network node.

9. The method of claim 3, wherein the indication of the selected maximum rank value indicates a configuration of sounding reference signal ports to be used by the first UE for the UL communication with the network node.

10. The method of claim 9, wherein one maximum rank value is selected per each configuration usable by the first UE for UL communication with the network node, and wherein the indication of the selected maximum rank value indicates which configuration to be used by the first UE.

11. The method of claim 3, wherein the maximum rank value is selected for UL communication in terms of UL data communication or UL control communication.

12. The method of claim 1, wherein the method further comprises:

determining a biasing value based on the interference affecting network information from the first UE; and
    selecting the UL MIMO transmission state based on of the biasing value and channel measurements for the first UE.

13. The method of claim 12, wherein the UL MIMO transmission state is defined by at least one of: a transmit precoder matrix indicator (TPMI), a transmission rank indicator (TRI), a sounding reference signal resource indicator (SRI).

14. The method of claim 13, wherein the TPMI, TRI, and/or SRI is selected based on optimizing spectral efficiency, and wherein the biasing value is an offset spectral efficiency value that biases selection of TPMIs, TRIs, and/or SRIs with lower rank over TPMIs, TRIs, and/or SRIs with higher rank.

15. The method of claim 12, wherein one biasing value is selected for the first UE served by a TRP of the network node, or wherein one biasing value is selected for a group of UEs comprising the first UE served by the TRP of the network node, or wherein one biasing value is selected for each UE of the group of UEs served by the TRP of the network node, or wherein one biasing value is selected for each UE of the group of UEs served by the TRP of the network node and at least one other TRP of the network node.

16. The method of claim 1, wherein the interference affecting network information pertains to at least one of: traffic load in a cell served by the network node, traffic load in a cell neighbouring the cell served by the network node, number of receiver radio chains in the network node.

17. The method of claim 1, wherein the interference affecting network information pertains to at least one of: average traffic load in a system in which the network node is operating, number of receiver radio chains in a network node serving a cell neighbouring the cell served by the network node, number of antenna ports at the first UE, frequency carrier used by the first UE for UL communication with the network node, number of aggregated carriers used by the first UE for UL communication with the network node, which link budget the first UE has, which priority communication of the first UE has, which type of application the UL communication with the network node pertains to, which power scaling scheme is applied at the first UE, which type of power class the first UE belongs to, which type of device the first UE is.

18. A network node for determining an uplink (UL) multiple-input multiple-output (MIMO) transmission state for at least a first user equipment (UE), the network node comprising processing circuitry, the processing circuitry being configured to cause the network node to:

obtain interference affecting network information for the first UE; and
    signal an indication of the UL MIMO transmission state towards the first UE, wherein the UL MIMO transmission state reflects a rank value, and wherein the rank value is based on the interference affecting network information.

19. A non-transitory computer readable storage medium storing a computer program for determining an uplink (UL) multiple-input multiple-output (MIMO) transmission state for at least a first user equipment (UE), the computer program comprising computer code which, when run on processing circuitry of a network node, causes the network node to:

obtain interference affecting network information for the first UE; and
    signal an indication of the UL MIMO transmission state towards the first UE, wherein the UL MIMO transmission state reflects a rank value, and wherein the rank value is based on the interference affecting network information.

* * * * *